2 Sheets--Sheet 1.

T. R. SINCLAIRE.
Liquid Filtering-Apparatus.

No. 165,377. Patented July 6, 1875.

Witnesses:
Edwd H Brown
A. J. De Lacy

Inventor:
Thos. R. Sinclaire

N. PETERS, PHOTO-LITHOGRAPHER, WASHINGTON, D. C.

2 Sheets--Sheet 2.
T. R. SINCLAIRE.
Liquid Filtering-Apparatus.
No. 165,377. Patented July 6, 1875.
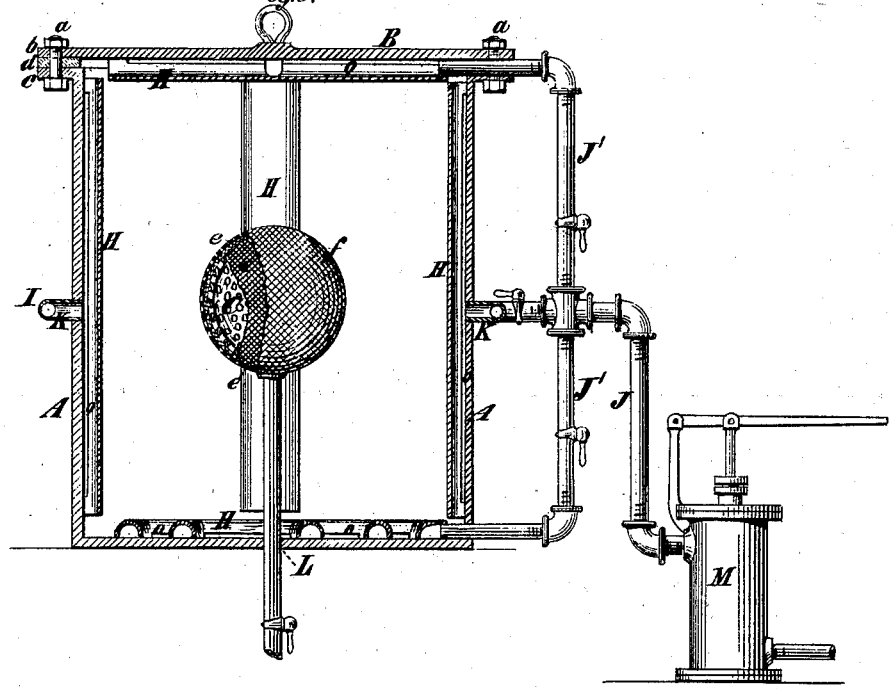
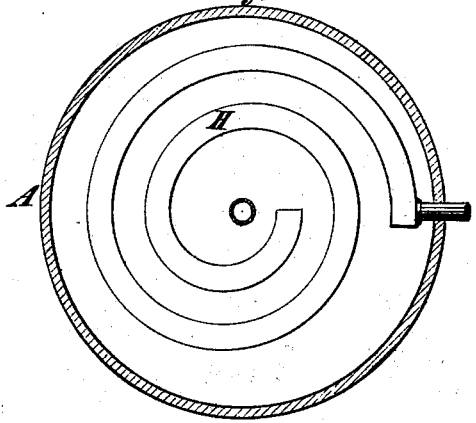
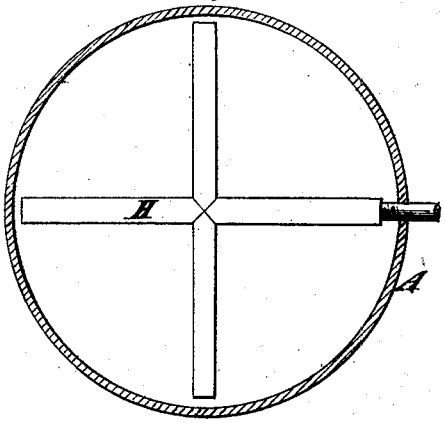
Witnesses:
Edwin A. Brown
A. J. De Lacy
Inventor:
Thos. R. Sinclaire

UNITED STATES PATENT OFFICE.

THOMAS R. SINCLAIRE, OF BROOKLYN, NEW YORK.

IMPROVEMENT IN LIQUID-FILTERING APPARATUS.

Specification forming part of Letters Patent No. 165,377, dated July 6, 1875; application filed May 31, 1875.

*To all whom it may concern:*

Be it known that I, THOMAS R. SINCLAIRE, of the city of Brooklyn, in the county of Kings and State of New York, have invented certain new and useful Improvement in Apparatus for Filtering Liquids; and I do hereby declare that the following is a full, clear, and exact description of the same, reference being had to the accompanying drawings, which form a part of this specification.

The object of my present invention is to so construct a filtering-vessel that the liquid to be filtered, under pressure, shall be enabled to form a chamber or passage-way around the inner surface or surfaces of the filtering-vessel by forcing the mass of charcoal or other filtering material away from close contact with such surface or surfaces, thereby affording provision for the liquid to be filtered to enter the mass of charcoal or other filtering material from many different points or directions, and thus effect the filtration or clarification of a given quantity of liquid within a given time, in a perfect or satisfactory manner, when using certain kinds of filtering material best adapted for certain liquids to be subjected to the process of filtration or clarification; and, to such end, the invention consists in certain combinations of parts or devices, which will be hereinafter specifically set forth.

Figure 1:
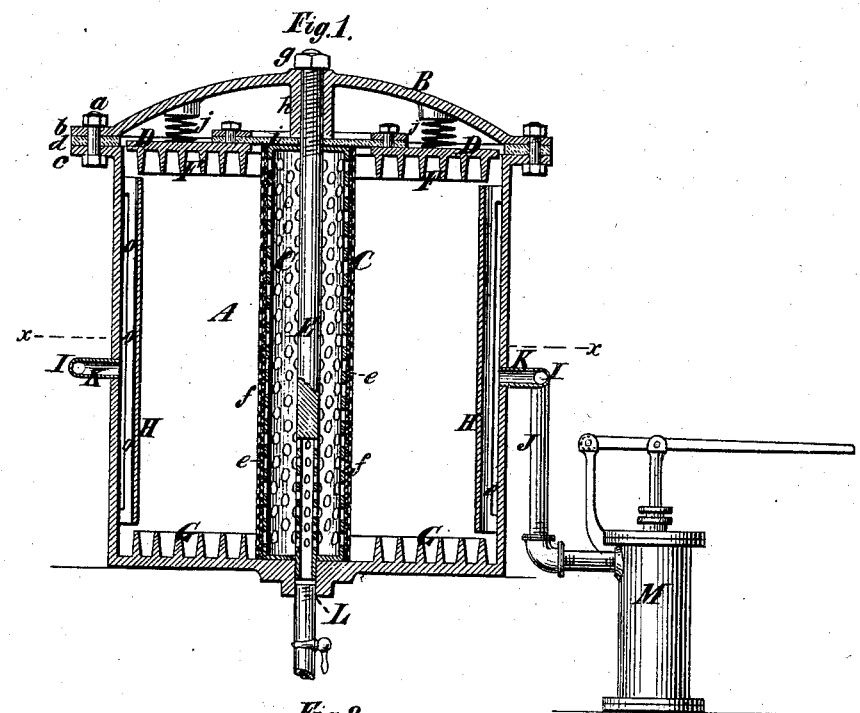
Figure 2:
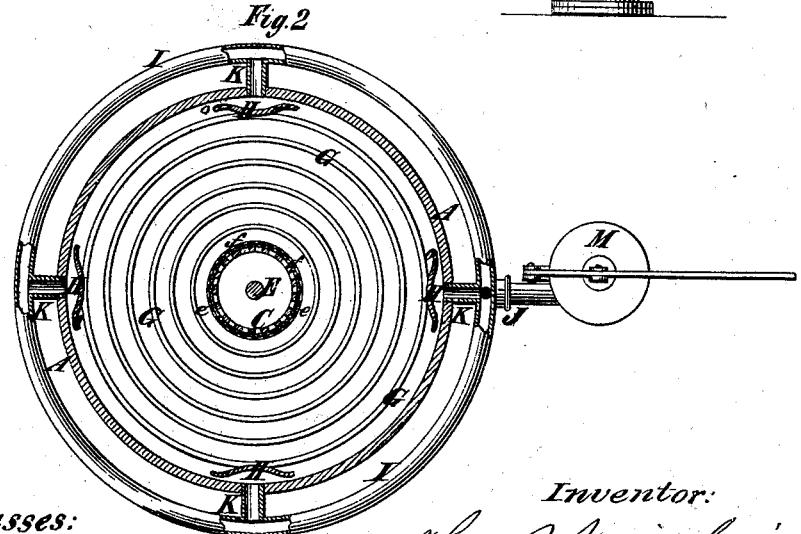

In the accompanying drawing, Figure 1 is a vertical central section of an apparatus illustrating my present invention. Fig. 2 is a transverse section of such apparatus, taken on a plane indicated by the line $x\ x$, Fig. 1. Fig. 3 is a vertical central section of a similar apparatus, showing certain modifications of my said invention; and Figs. 4 and 5 are plan views of the inner surfaces of the bottom and top, respectively, of the modification illustrated in Fig. 3, showing deflectors attached to these surfaces.

A designates a filtering-vessel, which may be of any suitable form or size. In the present instance it is an upright cylinder. B is a cover, which may be applied to the vessel in any suitable manner—as, for instance, by passing bolts $a$ through a flange, $b$, at its edge, and through a flange, $c$, on the upper end of the vessel A; and rubber packing $d$, or other suitable means, may be employed for forming a liquid-tight joint. C designates a receiver, which is represented in Fig. 1 as being an upright cylinder, arranged centrally within the vessel A, and as extending from the bottom of the vessel up to a diaphragm or plate, D, arranged in the upper part of the vessel A; and in Fig. 3 it is shown as being of spherical form, supported centrally within the vessel. I have shown this receiver as composed of perforated metal, having a covering of wire-gauze, $e$, and an outside jacket, $f$, of some suitable textile fabric; but the receiver may be made of any material which will permit liquids to pass through its wall or walls, or some suitable portion thereof; and such receiver may be of any other suitable form, size, or shape, and may communicate with the exterior of the vessel by means of a pipe or an orifice, or in any other suitable manner, and may be arranged wholly or partially within the vessel A.

In Fig. 1 of the drawing I have shown the receiver C as having a perforation or hole through its heads or ends for permitting it to be placed upon a rod or bolt, E, which latter is shown as being tubular, and as perforated for allowing the liquid to pass through such perforations. The number, location, and size of these perforations will, of course, be regulated according to the area of opening desired or required. The said rod or bolt E is shown as extending through the cover, and as entering an orifice in the bottom of the vessel A B, and as being provided, at its upper end, with a nut, $g$, by means of which (refer to Fig. 1) a hub, $h$, projecting downwardly from said cover, may be brought to bear against a rubber or other suitable disk, $i$, secured over a central opening in the plate or diaphragm D, causing said disk to bear or press upon the upper end of the receiver C in such manner as to form a tight joint. The under side of the cover is shown as provided with spiral springs $j$, so arranged as to bear upon the plate or diaphragm D, and assist in keeping it depressed. F designates a number of concentric rings or ledges projecting downwardly from the under surface of the diaphragm or plate D; and G designates a number of similar rings or ledges projecting upwardly from the bottom of the vessel. The object of these ledges is to present obstructions for preventing the passage of liquid along the surfaces upon which they are arranged. These rings or ledges may be set at various angles, and any desired number may be employed; and they may be arranged in various ways other than concentrically or continuously, if desired, and may be of the same or different depths. Attached to the inner surface of the vessel A there are a number of liquid-spreading plates or deflectors, whose office it is to spread or disseminate the liquid over the surface of the walls adjacent to which they are arranged, so as to form a space or passage between such surface or surfaces and the body or mass of charcoal or other filtering material contained within the filtering-vessel, thereby to afford ample provision for the liquid to enter the mass of filtering material under pressure from different or numberless directions or points around its exterior. These deflectors may be arranged vertically up and down the side walls of the vessel, or circumferentially, or spirally, or in the form of separate disks, around or on the same, or in any other suitable manner; or, as in the example shown in Fig. 3, over the entire inner surface of the vessel.

In the drawing I have shown the vertical wall of the vessel as provided with a number of concavo-convex vertical strips, H, with openings $o$ close to the inner surface of the vessel, (see Fig. 2,) and I have also shown a tube, I, passing around the vessel, with branches K opening into the vessel behind the deflecting strips or plates, the said tube also connecting, by a pipe, J, with a forcing apparatus, M, for introducing the liquid under pressure.

It is, of course, obvious that each deflector or liquid-spreading plate or disk may be supplied with liquid through a separate pipe leading from the forcing apparatus or other pressure-creating medium.

By reference to Fig. 3 it will be perceived that a number of the features shown in Fig. 1 are omitted; and in this figure I have shown the pipe J as provided with branch feeding-pipes J' J', for supplying liquid to the deflectors at the bottom and top of the vessel, which are shown more plainly in Figs. 4 and 5, respectively. I will remark that these top and bottom reflectors may be used or omitted, as may be desired; and where omitted the ledges F or G may be used, if desired. I will also remark that although the apparatus above described is more especially adapted for a process of filtration where the liquid is caused to pass from the exterior of the body of the filtering material through it toward and into a receiver, yet the reverse process may be practiced in the apparatus by attaching the pipe J to the pipe or orifice L, which communicates with the interior of the receiver, and in such case the receiver would change its functions, and perform the office of a distributer.

What I claim as my invention, and desire to secure by Letters Patent, is—

1. The combination, with a filtering-vessel, A, of liquid-spreading plates or deflectors, substantially as and for the purpose herein specified.

2. The combination of the filtering-vessel, the liquid-spreading plates or deflectors, and the receiver, substantially as herein specified.

3. The combination of the following elements: The filtering-vessel, the liquid-spreading plates or deflectors, the receiver, and the top and bottom rings or ledges, any or all, substantially as herein specified.

4. The combination of the following elements: The filtering-vessel, the receiver, the liquid-spreading plates or deflectors, and the forcing apparatus, with its connecting feed-pipes, substantially as and for the purpose specified.

THOS. R. SINCLAIRE.

Witnesses:
EDWIN H. BROWN,
A. J. DE LACY.